United States Patent
Pittman

(10) Patent No.: US 6,347,444 B1
(45) Date of Patent: Feb. 19, 2002

(54) METHOD FOR REFURBISHING AN AUTOMOTIVE WHEEL

(75) Inventor: William C. Pittman, Costa Mesa, CA (US)

(73) Assignee: Jason Irby, Huntington Beach, CA (US)

(*) Notice: Subject to any disclaimer, the term of this patent is extended or adjusted under 35 U.S.C. 154(b) by 0 days.

(21) Appl. No.: 09/574,105

(22) Filed: May 18, 2000

Related U.S. Application Data

(60) Provisional application No. 60/150,413, filed on Aug. 24, 1999.

(51) Int. Cl.⁷ .............................................. B23P 19/04
(52) U.S. Cl. ............................ 29/402.06; 29/402.18; 29/402.19; 29/527.4; 29/894.35
(58) Field of Search .................... 29/894.35, 402.01, 29/402.04, 402.05, 402.06, 402.18, 402.19, 527.4

(56) References Cited

U.S. PATENT DOCUMENTS 5,197,191 A * 3/1993 Dunkman et al. ....... 29/402.19

* cited by examiner

Primary Examiner—S. Thomas Hughes
Assistant Examiner—Jermie E. Cozart
(74) Attorney, Agent, or Firm—Fish & Richardson, P.C.

(57) ABSTRACT

A method of refurbishing a damaged section of the outer rim bead of an automotive wheel. The method comprises the initial step of contouring the outer rim bead via a first grinding process to create a feathered transition between the damaged section and the remainder of the outer rim bead. Thereafter, the damaged section is profiled via a second grinding process to generally conform the shape of the damaged section to the remainder of the outer rim bead. Finally, the damaged section is painted. The refurbishment steps may be completed on-site without removing the wheel from the vehicle and without removing the tire from the wheel.

12 Claims, 4 Drawing Sheets

METHOD FOR REFURBISHING AN AUTOMOTIVE WHEEL

CROSS-REFERENCE TO RELATED APPLICATIONS

The present application claims priority to U.S. Provisional Application Serial No. 60/150,413 entitled REFURBISHING METHOD OF DAMAGED AUTOMOTIVE WHEELS AND THE MOBILE BUSINESS RELATING TO SUCH filed Aug. 24, 1999, the disclosure of which is incorporated herein by reference.

STATEMENT RE: FEDERALLY SPONSORED RESEARCH/DEVELOPMENT (Not Applicable)

BACKGROUND OF THE INVENTION

The present invention relates generally to automotive wheels, and more particularly to a method and related apparatus for repairing abrasive damage to the outer rim bead of an automotive wheel without removing the wheel from the automobile and without removing the tire from the wheel.

One of the more prominent features of an automobile is the wheels thereof. Indeed, consumers sometimes expend significant sums during the purchase of new automobiles to upgrade the factory "standard" wheels to a more ornate or stylized wheel. Despite having differing ornamental/aesthetic attributes, automotive wheels are generally fabricated from an aluminum alloy or steel, with aluminum alloy wheels being the most common.

Irrespective of their overall appearance, a common structural attribute or feature of all automotive wheels is the annular outer rim bead which extends in sealed engagement to the tire mounted to the wheel. The outer rim bead typically defines the outer or distal most portion of the wheel, and thus is the most highly susceptible to damage when the corresponding tire is inadvertently subjected to abrasive contact from, for example, a curb as often occurs during turning and parallel parking of the automobile. Because of the orientation of the outer rim bead relative to the tire, the abrasive contact of the tire to a curb or similar obstruction typically results in abrasive contact to the outer rim bead, often causing abrasive damage and/or superficial fragmentation damage to one or more sections thereof attributable to such impact. Due to the visual prominence of the automotive wheels and location of the outer rim bead relative to the tire, damage to even a relatively small section of the outer rim bead is often easily noticeable upon quick visual observation of the wheel.

In the automotive industry, it is well known for automobile dealerships to employ the use of outside service providers in relation to various repair/maintenance services, including dent (i.e., "door ding") repair, car washing, windshield/window replacement, and wheel repair. Certain ones of these service providers perform their respective services on-site as a means of minimizing the related costs. With particular regard to those service providers involved with automotive wheel repair, the use of such service providers by dealerships is occasioned not only when automobiles including damaged wheels are brought to the dealership by car owners as a result of an impact as described above, but also upon the delivery of new vehicles which sometimes require wheel repair. Additionally, used cars acquired by dealerships at auctions, as trade-ins, or at the termination of a lease often require wheel repair. Due to the relatively high cost of automotive wheels, it is often more economical for either the vehicle owner or dealership to incur the cost of off-site repair to an abrasion damaged outer rim bead than to purchase a complete replacement wheel. It will be recognized that the degree of damage to the outer rim bead of the wheel must be such that repair is possible, in that extensive damage will necessitate complete replacement of the wheel since the seal between the outer rim bead and the tire cannot be unduly compromised.

The repair method currently practiced by wheel repair service providers involves initially removing the wheel assembly (i.e., the wheel and accompanying tire) from the vehicle, and thereafter removing the tire from the wheel. The outer rim bead of the wheel is then subjected to a labor intensive, time consuming machining process using a lathe for purposes of turning off a sufficient amount of material to blend the damaged section into the remainder of the outer rim bead. The outer rim bead is then painted and coated for purposes of blending the overall color thereof to the remainder of the wheel. The tire is then re-mounted to the wheel, with the wheel assembly then being re-mounted to the vehicle. Because of the complexity of the refurbishment process, the same must typically be conducted off-site at a location where the service provider has access to the necessary repair machinery. As will appreciated, the labor intensive and time consuming nature of the currently practiced wheel repair process, coupled with the typical need to take the wheel off-site to facilitate such repair, results in the related cost being relatively high. Thus, in many instances, these known methods of wheel repair have proven economically impractical, with the cost prohibitive nature of the repair process being due in large part to the time involved in conducting the same off-site.

The present invention provides a significant improvement over the above-described prior art wheel repair method by providing a repair methodology and related apparatus which allows for the on-site refurbishing of a damaged automotive wheel without removing the wheel from the vehicle and without removing the tire from the wheel. The present method and related apparatus allows for the completion of the repair procedure in short time periods of twenty minutes or less, with the quickness of the process largely being attributable to the absence of the need to remove the wheel from the vehicle and to remove and remount the tire. Thus, the present methodology is substantially more economical and cost effective than those currently practiced in the prior art in relation to wheel repair. The present method and related apparatus will be discussed in more detail below.

BRIEF SUMMARY OF THE INVENTION

In accordance with the present invention, there is provided a method and related apparatus for repairing/refurbishing a damaged section of the outer rim bead of an automotive wheel. The present method may be implemented without removing the wheel from the automobile or other vehicle and without removing the tire from the wheel. The present method comprises the initial step of contouring the outer rim bead via a first grinding process to create a feathered transition between the damaged section and the remainder of the outer rim bead. Upon the completion of the first grinding process, the damaged section of the outer rim bead is profiled or shaped via a second grinding process to generally conform the shape of the damaged section to the remainder of the outer rim bead. Finally, the damaged section is painted to blend the color and appearance thereof into the remainder of the outer rim bead, and hence the entire wheel. As indicated above, the contouring, profiling and painting steps are preferably completed with the wheel being mounted to the vehicle, and the tire being mounted to the wheel. Thus, the present refurbishment method is well suited to being conducted on-site, though the same may also be conducted off-site upon the removal of the wheel from the vehicle.

In the present method, the step of painting the damaged section itself preferably comprises the initial step of applying a transparent adhesion promoter to the damaged section, which is followed by the step of applying a basecoat to the adhesion promoter. The application of the basecoat is followed by the application of a catalyzed clearcoat to the basecoat. A preferred clearcoat is a VOC compliant, catalyzed urethane. These three application steps are preferably completed through the use of either a HVLP spray gun or an airbrush gun. If the abrasive damage to the outer rim bead is not severe, the initial contouring step (i.e., the first grinding process) may be omitted.

The first (if needed) and second grinding processes discussed above are each preferably completed through the use of a flapwheel comprising a central hub and a multiplicity of elongate, abrasive flaps which each include an inner end attached to the hub and a distal, outer end having an arcuate recess formed therein. The outer rim bead of the wheel is of a particular bead radius, with the recess within the outer end of each of the flaps of the flapwheel preferably being of a flap radius which is substantially equal to the bead radius. The flapwheel, and more particularly a drive shaft extending axially from the central hub, is preferably attached to a power hand tool, and more particularly to either a high rpm pneumatic hand tool or an electric laminate trimmer or router.

BRIEF DESCRIPTION OF THE DRAWINGS

These, as well as other features of the present invention will become more apparent upon reference to the drawings wherein.

DETAILED DESCRIPTION OF THE INVENTION

Figure 1:
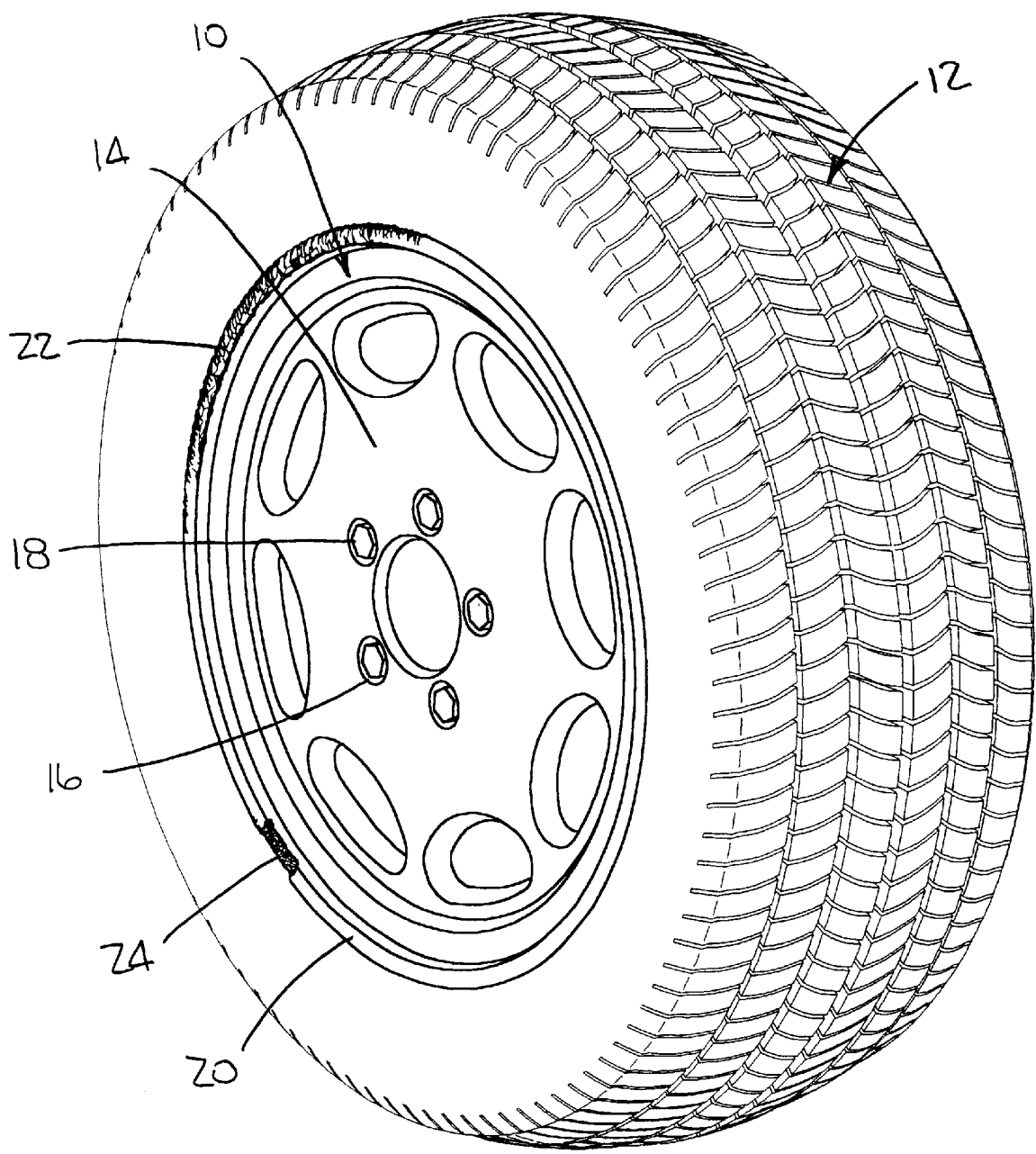
FIG. 1 is a perspective view of an automotive wheel having a tire mounted thereto, illustrating exemplary abrasive damage to the outer rim bead of the wheel.

Referring now to the drawings wherein the showings are for purposes of illustrating a preferred embodiment of the present invention only, and not for purposes of limiting the same, FIG. 1 perspectively illustrates a typical automotive wheel 10 having a tire 12 mounted thereto. The wheel 10 includes a central hub portion 14 in which is formed a plurality of recesses or receptacles 16 which accommodate respective ones of the lug nuts 18 used to mount the wheel 10 to the vehicle. Projecting outwardly from the hub portion 14 is an annular, outer rim bead 20 which extends in sealed engagement to the tire 12 mounted to the wheel 10. As indicated above, the outer rim bead 20 typically defines the outer or distal most portion of the wheel 10, and thus is the most highly susceptible to damage when the corresponding tire 12 is inadvertently subjected to abrasive contact from, for example, a curb as often occurs during turning and parallel parking of the vehicle. Those of ordinary skill in the art will recognize that the hub portion 14 of the wheel 10 may be provided in a wide range of styles differing from the particular style depicted in FIG. 1.

Because of the orientation of the outer rim bead 20 relative to the tire 12, the abrasive contact of the tire 12 to a curb or similar obstruction typically results in abrasive contact to the outer rim bead 20. Such impact may result in different types of damage to the outer rim bead 20, including abrasive damage 22 and superficial fragmentation damage 24, examples of which are shown in FIG. 1. As is evident from FIG. 1, the superficial fragmentation damage 24 is more severe than the abrasive damage 22 in that the superficial fragmentation damage 24 extends deeper into the outer rim bead 20 as compared to the abrasive damage 22 which is predominately confined to the outermost surface of the outer rim bead 20. It will be recognized that the degree of superficial fragmentation damage 24 to the outer rim bead 20 must be such that repair in accordance with the methodology and apparatus as will be discussed below is possible, in that extensive damage will necessitate complete replacement of the wheel 10 since the seal between the outer rim bead 20 and the tire 12 cannot be unduly compromised. As also indicated above, due to the visual prominence of the wheel 10 and location of the outer rim bead 20 relative to the tire 12, damage to even a relatively small section of the outer rim bead 20 is often easily noticeable upon quick visual observation of the wheel 10.

Figure 2:
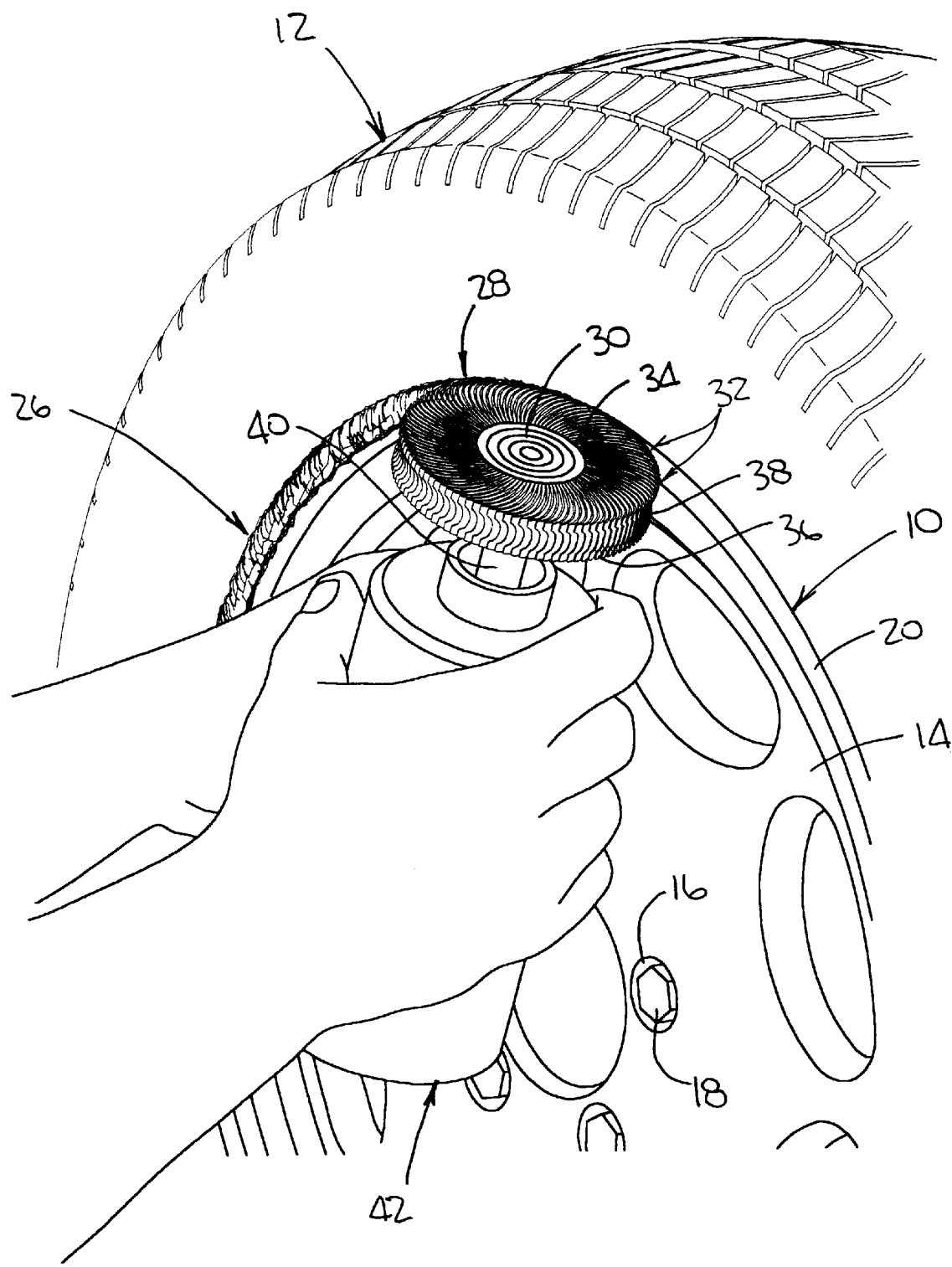
FIG. 2 is a perspective view illustrating an initial step in the repair of the outer rim bead of the wheel through the use of the apparatus and related methodology of the present invention.

Referring now to FIG. 2, the repair/refurbishing method of the present invention may be implemented without removing the wheel 10 from the vehicle, and without removing the tire 12 from the wheel 10. In FIG. 2, the reference numeral 26 will be used to label a "damaged section" of the outer rim bead 20, with it being understood that the damaged section 26 may comprise the abrasive damage 22 and/or the superficial fragmentation damage 24 exemplified in FIG. 1. The present method comprises the initial step of contouring the outer rim bead 20 via a first grinding process to create a feathered transition between the damaged section 26 and the remainder of the outer rim bead 20. The first grinding process will usually be employed when the damaged section 26 includes the superficial fragmentation damage 24 due to the typical depth of such superficial fragmentation damage 24 within the outer rim bead 20. Whether the first grinding process is employed when the damaged section 26 comprises solely the abrasive damage 22 is dependent upon the severity of such abrasive damage 22. As indicated above, superficial fragmentation damage 24 of an excessive depth within the outer rim bead 20 often does not lend itself to repair via the present process.

Upon the completion of the first grinding process, the damaged section 26 of the outer rim bead 20 is profiled or shaped via a second grinding process to generally conform the shape of the damaged section 26 to the remainder of the outer rim bead 20. In most instances, the initial contouring step (i.e., the first grinding process) will be omitted if the abrasive damage to the outer rim bead 20 is not severe, i.e., the damaged section 26 comprises only relatively minor abrasive damage 22. In this respect, the profiling or shaping of the damaged section 26 via the second grinding process when the damaged section 26 comprises only abrasive damage 22 is generally sufficient to conform the shape of the damaged section 26 to the remainder of the outer rim bead 20 in the desired manner.

Figure 4:
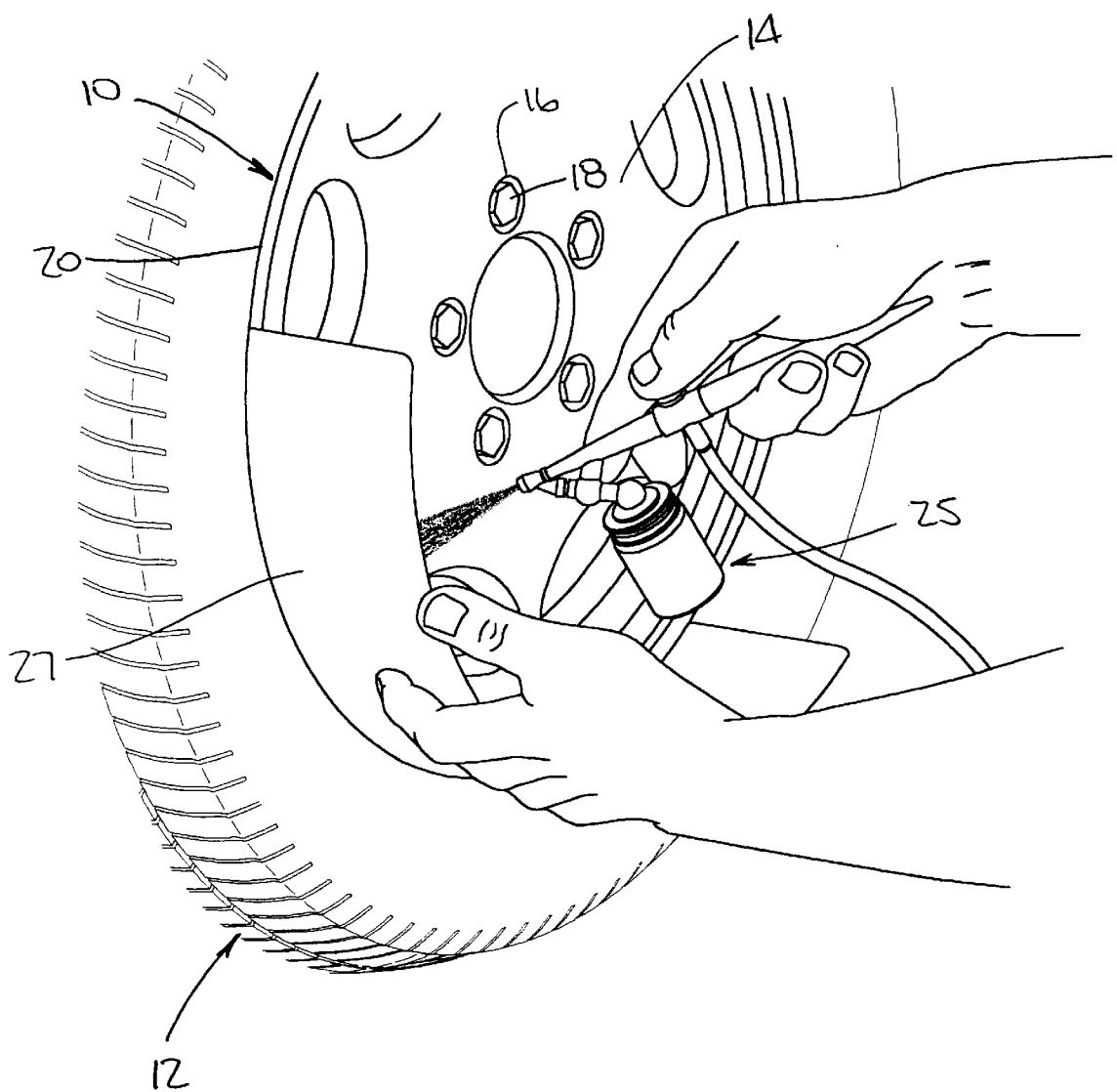
FIG. 4 is a perspective view illustrating a finishing step in the repair of the outer rim bead of the wheel through the use of the apparatus and related methodology of the present invention.

Referring now to FIG. 4, upon the completion of the first (if needed) and second grinding processes, the damaged section 26 is painted to blend the color and appearance thereof into the remainder of the outer rim bead 20, and hence the entire wheel 10. The step of painting the damaged section 26 itself preferably comprises the initial step of applying a transparent adhesion promoter to the damaged section 26, which is followed by the step of applying a basecoat to the adhesion promoter. The application of the basecoat is followed by the application of a catalyzed clearcoat to the basecoat. A preferred clearcoat is a VOC compliant, catalyzed urethane. These three application steps are preferably completed through the use of either a HVLP spray gun 25 or an airbrush gun. During any one of these application steps, a guard or shield 27 may be extended about a portion of the outer rim bead 20 in the manner shown in FIG. 4 to prevent overspray onto the tire 12. As indicated above, the above-described contouring, profiling, and painting steps are preferably completed with the wheel 10 being mounted to the vehicle and the tire 12 being mounted to the wheel.

Figure 3:
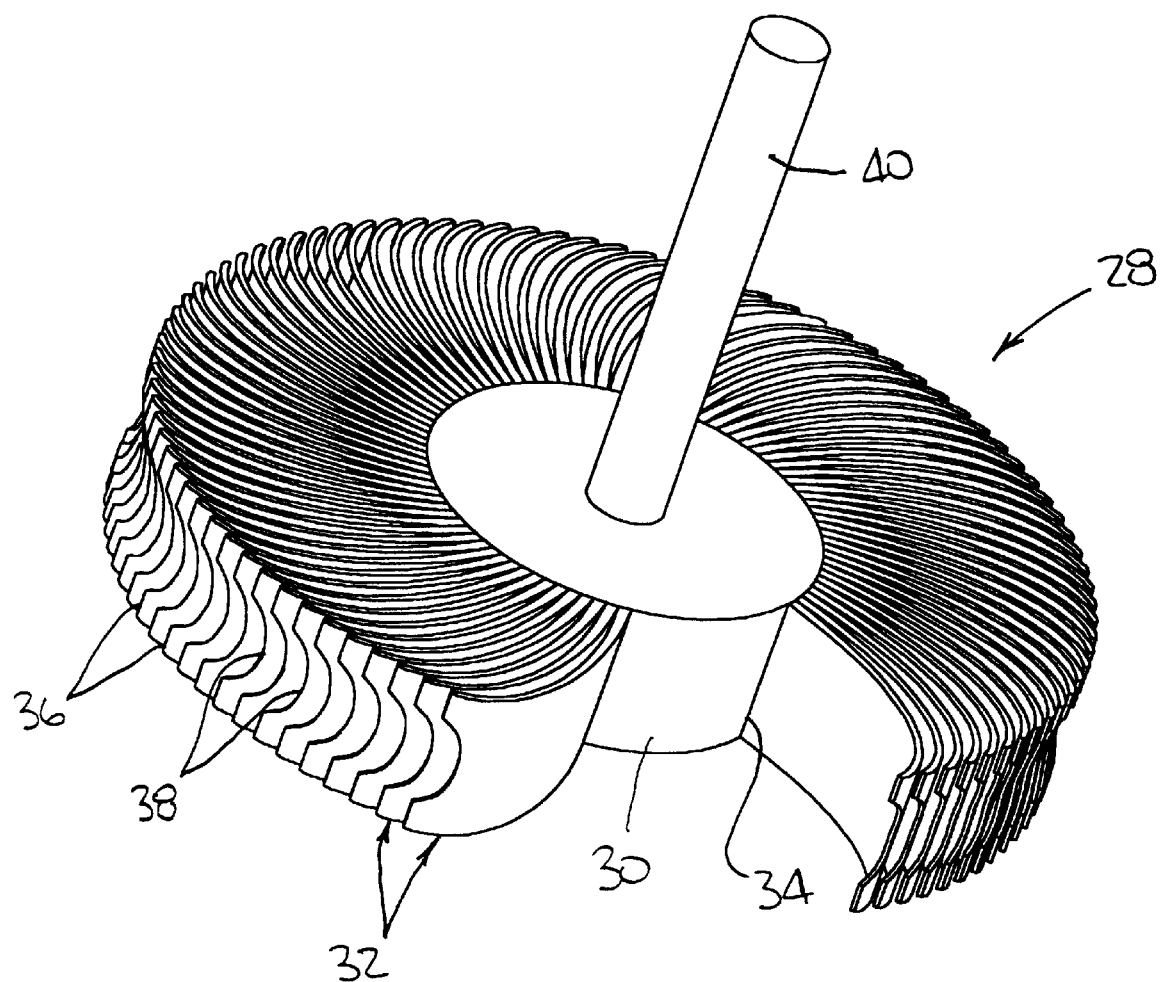
FIG. 3 is a partial perspective view of a flapwheel used in relation to the repair methodology of the present invention.

Referring now to FIGS. 2 and 3, the first and second grinding processes discussed above are each preferably completed through the use of a flapwheel 28 comprising a circularly configured central hub 30 and a multiplicity of elongate, abrasive flaps 32 which each include an inner end 34 attached to the hub 30 and a distal, outer end 36 having an arcuate recess 38 formed therein. The outer rim bead 20 of the wheel 10 is of a particular bead radius, with the recess 38 within the outer end 36 of each of the flaps 32 of the flapwheel 28 preferably being of a flap radius which is substantially equal to the bead radius. The flapwheel 28 may be provided as a conventional off-the-shelf synthetic abrasive disk (e.g., a 3M Roloc Scothbrite disk) which is specifically altered to facilitate the formation of the recess 38 within the outer end 36 of each of the flaps 32.

In accordance with the present invention, the flapwheel 28, and more particularly a drive shaft 40 extending axially from the hub 30, is preferably attached to a power hand tool 42. The power hand tool 42 may comprise either a high rpm pneumatic hand tool or an electric laminate trimmer or router. However, those of ordinary skill in the art will recognize that other suitable power hand tools may be employed which are operative to facilitate the rotation of the flapwheel 28 at the necessary rpm's. When an electric laminate trimmer is employed as the power hand tool 42, the cutting bit thereof is removed and substituted with a collet configured to properly engage the drive shaft 40 of the flapwheel 28 as necessary to properly secure the flapwheel 28 to the power hand tool 42. Those of ordinary skill in the art will recognize that the present method may be practiced through the use of flapwheels 28 which each include differently sized recesses 38, with the selected flapwheel 28 corresponding to the particular bead radius of the outer rim bead 20 of the wheel 10. As indicated above, the present method may be completed while the wheel 10 is mounted the vehicle and the tire 12 is mounted to the wheel 10. The present method may easily be completed on-site, thus substantially reducing the cost associated therewith. This minimized cost is also attributable to the relatively short time involved in completing a repair/refurbishment process through the use of the present method which typically takes 20 minutes or less.

Additional modifications and improvements of the present invention also will be apparent to those of ordinary skill in the art. Thus, the parts and steps described and illustrated herein are intended to represent only one embodiment of the present invention, and are not intended to serve as limitations of alternative embodiments within the spirit and scope of the invention.

What is claimed is:

1. In an automotive wheel having a outer rim bead, a method of refurbishing a damaged section of the outer rim bead comprising the steps of:

(a) contouring the outer rim bead via a first grinding process to create a feathered transition between the damaged section and the remainder of the outer rim bead, the first grinding process being completed through the use of a flapwheel comprising:

a central hub; and a multiplicity of elongate, abrasive flaps which each include an inner end attached to the hub and an outer end having an arcuate recess formed therein;

(b) profiling the damaged section via a second grinding process which is completed through the use of the flapwheel to generally conform the shape of the damaged section to the remainder of the outer rim bead; and (c) painting the damaged section;

wherein steps (a)–(c) are completed with the wheel being mounted to a vehicle.

2. The method of claim 1 wherein steps (a)–(c) are completed with a tire being mounted to the wheel.

3. In an automotive wheel having a outer rim bead, a method of refurbishing a damaged section of the outer rim bead comprising the steps of:

(a) contouring the outer rim bead via a first grinding process to create a feathered transition between the damaged section and the remainder of the outer rim bead, the first grinding process being completed through the use of a flapwheel comprising:

a central hub; and a multiplicity of elongate, abrasive flaps which each include an inner end attached to the hub and an outer end having an arcuate recess formed therein;

(b) profiling the damaged section via a second grinding process which is completed through the use of the flapwheel to generally conform the shape of the damaged section to the remainder of the outer rim bead; and (c) painting the damaged section, comprising (1) applying an adhesion promoter to the damaged section, (2) applying a basecoat to the adhesion promoter, and (3) applying a clearcoat to the basecoat.

4. The method of claim 3 wherein:

step (1) comprises applying a transparent adhesion promoter to the damaged section; and step (3) comprises applying a catalyzed clearcoat to the basecoat.

5. The method of claim 4 wherein step (3) comprises applying a VOC compliant, catalyzed urethane to the basecoat.

6. The method of claim 3 wherein steps (1)–(3) are completed through the use of an application device selected from the group consisting of:

a HVLP spray gun; and an airbrush gun.

7. In an automotive wheel having an outer rim bead, a method of refurbishing a damaged section of the outer rim bead comprising the steps of:

(a) profiling the damaged section via a grinding process to generally conform the shape thereof to the remainder of the outer rim bead, the grinding process being completed through the use of a flapwheel comprising:

a central hub; and a multiplicity of elongate, abrasive flaps which each include an inner end attached to the hub and an outer end having an arcuate recess formed therein;

(b) painting the damaged section;

wherein steps (a) and (b) are completed with a tire being mounted to the wheel and the wheel being mounted to a vehicle.

8. In an automotive wheel having an outer rim bead, a method of refurbishing a damaged section of the outer rim bead comprising the steps of:

(a) profiling the damaged section via a grinding process to generally conform the shape thereof to the remainder of the outer rim bead, the grinding process being completed through the use of a flapwheel comprising:

a central hub; and a multiplicity of elongate, abrasive flaps which each include an inner end attached to the hub and an outer end having an arcuate recess formed therein;

(b) painting the damaged section, comprising (1) applying a transparent adhesion promoter to the damaged section, (2) applying a basecoat to the adhesion promoter, and (3) applying a catalyzed clearcoat to the basecoat.

9. In an automotive wheel which is mounted to a vehicle and has a tire mounted thereto, a method of refurbishing a damaged section of an outer rim bead of the wheel without removing the wheel from the vehicle and without removing the tire from the wheel, the method comprising the steps of:

(a) contouring the outer rim bead via a first grinding process to create a feathered transition between the damaged section and the remainder of the outer rim bead;

(b) profiling the damaged section via a second grinding process to generally conform the shape of the damaged section to the remainder of the outer rim bead; and (c) painting the damaged section.

10. The method of claim 9 wherein steps (a) and (b) comprise completing the first and second grinding processes through the use of a flapwheel comprising:

a central hub; and a multiplicity of elongate, abrasive flaps which each include an inner end attached to the hub and an outer end having an arcuate recess formed therein.

11. The method of claim 10 wherein the outer rim bead is of a particular bead radius, and steps (a) and (b) comprise completing the first and second grinding processes through the use of a flapwheel wherein the recess within the outer end of each of the flaps thereof is of a flap radius which is substantially equal to the bead radius.

12. The method of claim 9 wherein step (c) comprises the steps of:

(1) applying a transparent adhesion promoter to the damaged section;

(2) applying a basecoat to the adhesion promoter; and (3) applying a catalyzed clearcoat to the basecoat.

* * * * *